(12) United States Patent  (10) Patent No.: US 8,978,762 B2
Berry et al.  (45) Date of Patent: Mar. 17, 2015

(54) WELL SERVICING FLUID AND METHOD OF SERVICING A WELL WITH THE FLUID

(75) Inventors: Sandra L. Berry, Tomball, TX (US); Joel L. Boles, Spring, TX (US); Kay E. Cawiezel, Fulshear, TX (US); Kern L. Smith, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 605 days.

(21) Appl. No.: 13/193,152

(22) Filed: Jul. 28, 2011

(65) Prior Publication Data

US 2013/0025870 A1 Jan. 31, 2013

(51) Int. Cl.
E21B 43/00 (2006.01)
C09K 8/74 (2006.01)

(52) U.S. Cl.
CPC ........................ C09K 8/74 (2013.01)
USPC ............... 166/305.1; 166/310; 166/270.1; 166/271; 507/219; 507/237; 507/274

(58) Field of Classification Search
USPC ............... 166/270.1, 272, 279, 305.1, 308.1, 166/308.2, 308.3
See application file for complete search history.

(56) References Cited

U.S. PATENT DOCUMENTS

| 3,613,788 | A | | 10/1971 | Kautsky |
| 3,958,635 | A | * | 5/1976 | Zilch et al. ................. 166/244.1 |
| 4,030,548 | A | * | 6/1977 | Richardson et al. .......... 166/279 |
| 5,207,919 | A | | 5/1993 | Breen et al. |
| 5,226,481 | A | | 7/1993 | Le et al. |
| 5,263,539 | A | * | 11/1993 | Salimi et al. .................. 166/279 |
| 6,367,548 | B1 | | 4/2002 | Purvis et al. |
| 2005/0137095 | A1 | | 6/2005 | Cawiezel et al. |
| 2006/0102349 | A1 | | 5/2006 | Brady et al. |
| 2007/0281868 | A1 | * | 12/2007 | Pauls et al. ..................... 507/213 |

OTHER PUBLICATIONS

"AkzoNobel GLDA chelates approved by US EPA", Press Release dated Aug. 16, 2010, Akzo Nobel Functional Chemicals B.V., The Netherlands.
"Nitrilotriacetic Acid" Wikipedia, retrieved from http://en.wikipedia.org/wiki/Nitrilotriacetic_acid.
International Search Report & Written Opinion issued in PCT/US2012/039403 and dated Aug. 8, 2012.

* cited by examiner

*Primary Examiner* — Zakiya W Bates
*Assistant Examiner* — Silvana Runyan
(74) *Attorney, Agent, or Firm* — Parsons Behle & Latimer (57) ABSTRACT

A well servicing fluid is formulated by combining ingredients comprising: an aqueous based fluid comprising sulfate ions at a concentration greater than 50 mg/l; a chelating agent; and an acid in an amount sufficient to result in the well servicing fluid having a pH of 4.5 or less. A method of servicing a well is also disclosed.

25 Claims, 7 Drawing Sheets

WELL SERVICING FLUID AND METHOD OF SERVICING A WELL WITH THE FLUID

FIELD OF THE DISCLOSURE

The present disclosure relates generally to well servicing fluids used in hydrocarbon producing wells and similar boreholes, and methods of stimulating wells using the well servicing fluids.

BACKGROUND

The flow of oil from a subterranean formation to a well bore depends on various factors, including permeability of the formation. Often, permeability of the formation is insufficient to allow a desired flow rate of fluids, such as oil and gas, from the formation. In these cases, the formation can be treated to increase permeability.

Acidizing limestone and dolomite formations with HCl acid is one method to increase the yield of oil and gas from the formation. The limestone or dolomite formation can be stimulated by pumping HCl acids down the wellbore tubing, casing, or thru coiled tubing. The HCl acid is then injected into the formation to dissolve the limestone or dolomite rock, thereby forming a conductive channel extending from the wellbore into the formation area containing the oil and gas. At the conclusion of the acid treatment the spent acid can be recovered from the formation at the surface.

The most common acid utilized to stimulate limestone or dolomite formations is HCl, in strengths ranging from about 7.5% to about 28% by weight. The most common acid strength utilized for acid stimulation is 15% HCl. HCl acid treatments are usually formulated with fresh water, 32% HCl acid stock, and other additives such as corrosion inhibitor, iron control agents, and clay stabilizers.

The acid system formulated with fresh water reacts with the limestone or dolomite formation to form by-products of calcium chloride liquid brine and carbon dioxide gas. Acid systems mixed with fresh water form little or no solid precipitates, allowing the acid to freely react with the limestone or dolomite rock to form a straight conductive channel into the formation. The goal of the acid stimulation is to form a long extended conductive channel deep into the productive zone.

Acid stimulation fluids are usually mixed with fresh water, but if fresh water supplies are limited or unavailable, seawater is sometimes substituted for fresh water in part or full. One specific area where this often occurs is the offshore boat stimulation market.

While an acid treatment formulated with fresh water results in little or no solid precipitation formation, major solid precipitation problems in the formation can arise when acids are mixed with seawater. Stimulation of limestone or dolomite formations with HCl acid systems formulated with seawater achieves less than desirable stimulation results because of this solids precipitate. When acid systems are formulated with seawater containing high levels of sulfate ions, calcium sulfate precipitates as the acid reacts with limestone or dolomite formation. The extent of calcium sulfate deposition or scaling, although sometimes accepted or ignored by some customers, can result in post stimulation results far below their true potential.

Historically, various technologies can remove sulfite from seawater, thereby reducing precipitate formation. However, these technologies are expensive and logistically challenging or impractical to use on offshore installations or conventional stimulation vessels. These various technologies include ion exchange, ion specific resins, or barium chloride precipitation.

A cost effective method to chemically reduce calcium sulfate precipitation from sulfate-laden water during acid reaction of the stimulation process would be very advantageous. Such a chemical treatment system could provide one or more benefits, such as reducing the need to pre-treat seawater, simplifying logistics or increasing stimulation efficiency.

SUMMARY

An embodiment of the present disclosure is directed to a well servicing fluid. The well servicing fluid is formulated by combining ingredients comprising: an aqueous based fluid comprising sulfate ions at a concentration greater than 50 mg/l; a chelating agent; and an acid in an amount sufficient to result in the well servicing fluid having a pH of 4.5 or less.

Another embodiment of the present disclosure is directed to a method of servicing a well. The method comprises combining a chelating agent, an acid and an aqueous based fluid comprising sulfate ions at a concentration greater than 50 mg/l to form an acidic well servicing fluid. The acidic well servicing fluid is introduced into a well so as to stimulate a well formation, thereby increasing a concentration of multivalent cations in the well servicing fluid. The concentration of chelating agent is sufficient to hinder a reaction of the increased concentration of multivalent cations with the sulfate ions and to reduce an amount of precipitate produced by the reaction in the well relative to the amount of precipitate that would otherwise have been produced if the chelating agent was not present.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a fluid that can be used for stimulating wells. The well stimulation fluid can be formulated by combining ingredients comprising an aqueous based fluid comprising sulfate ions; a chelating agent; and an acid.

Examples of suitable aqueous based fluid can include seawater or mixtures of seawater and tap water. Other examples of aqueous based fluids having significant sulfate concentrations can be used, such as brines or produced water. The aqueous based fluid can have sulfate concentrations higher than 50 mg/l, such as, for example, higher than 200 mg/l, which can result in the precipitation of calcium sulfate solids when the acid reacts with a limestone or dolomite formation, producing calcium and/or magnesium ions capable of reacting with the sulfate ions to form sulfate salts of calcium and/or magnesium.

In an embodiment, the aqueous based fluid can include at least one cation chosen from $Ca^{+2}$ and $Mg^{+2}$ ions. Seawater, for example, is typically composed of various cations such as calcium, magnesium, and sodium, as well as anions such as sulfate, bicarbonate, and carbonate. In an embodiment, the aqueous based fluid has a total hardness, as $CaCO_3$, of greater than 1000 mg/l.

The chelating agent can be any suitable compound that is capable of chelating the multivalent ions sufficiently to hinder the reaction of the multivalent ions with sulfates and thereby reduce precipitate formation in the well formation environment. Examples of suitable chelating agents include inorganic polyphosphates or polyphosphonic acids or salts or esters thereof. Examples of inorganic polyphosphates include calcium phosphates, magnesium polyphosphates and sodium polyphosphates. Examples of polyphosphonic acid based chelating agents include diethylenetriaminepenta(methylene phosphonic acid) ("DTPMPA") or salts or esters thereof, nitrilotrimethylene phosphonic acid or salts or esters thereof ethylenediamine hydroxydiphosphonic acid or salts or esters thereof, ethylenediamine tetramethylene phosphonic acid or salts or esters thereof and bis(hexaniethylene triamine penta) methylene phosphonic acid ("BHMT") or salts or esters thereof.

The salts of the above chelating agents can be any suitable salt, such as sodium or potassium salts thereof. The esters of the chelating agents can be any suitable ester, such as alkyl or aryl esters.

Examples of commercially available chelating agents that can be employed in the compositions of the present disclosure include DEQUEST® 2066, which is a solution of penta Na salt of Diethylenetriamine penta(methylene phosphonic acid), having a concentration of about 24% to about 26% by weight DIPMPA at a pH of about 5.5; DEQUEST 2060S, which is an acid form of about 48% to about 52% by weight DTPMPA with a pH of about 0.1; DEQUEST 2090, which is about 43% to about 48% by weight Bis(hexamethylene triamine penta) methylenephosphonic acid at a pH of about 0.4; and DEQUEST 2060A, which is about 45 to about 47% by weight of DTPMPA partially neutralized to a pH of about 2 to about 3.

The concentration of chelating agent employed may vary depending on such factors as the particular chelating agent being used, the concentration of acid employed and the expected concentration of divalent ions to be chelated during stimulation of the well formation. Exemplary concentrations of cheating agent may range from about 5 gpt to a concentration of about 120 gallons per thousand ("gpt"). In general, the lower the acid concentration, the less chelating agent that can be used to achieve the desired outcome. In an example composition using Dequest 2066 in acid mixed with seawater comprising about 4500 ppm sulfate and acid concentrations ranging from about 28% by weight HCl to about 7% by weight HCl, the amount of chelating agent employed may range, for example, from about 120 gpt to about 30 gptIn other example compositions comprising a chelating agent chosen from Dequest 2060S, Dequest 2090, or Dequest 2060A in acids mixed with seawater comprising about 4500 ppm sulfate and acid concentrations ranging from about 28% by weight HCl to about 7% by weight HCl, the amount of chelating agent employed may range, for example, from about 60 gpt to about 15 gpt.

The acid employed in the well servicing fluid can be any suitable acid that can be used for increasing the porosity (permeability) of calcium and/or magnesium containing well formations, such as limestone or dolomite formations. Examples of suitable acids include HCl, acetic acid and formic acid.

Sufficient acid is included to result in the well servicing fluid being acidic. For example, the well servicing fluid can have a pH of 4.5 or less, such as a pH of 1 or less. In an embodiment, the pH can range from about 0 to about 4.

The well servicing fluids of the present disclosure can be formulated to include additional optional ingredients. Examples of additional well known ingredients include corrosion inhibitors, iron control agents, clay stabilization additives, surfactants, biopolymer degradation additives, fluid loss control additives, high temperature stabilizers, viscosifying agents and cross-linkers.

In an embodiment, where the well servicing fluids of the present disclosure include a viscosifying agent, the viscosifying agent is not a hydratable polysaccharide from natural sources, such as galactomannan gums, glucomannan gums, guars, such as guar gum, and cellulose derivatives. Other examples of such hydratable polysaccharides are disclosed in U.S. Pat. No. 5,226,481, issued to Hoang V. Le, et al. ("the Le reference"), on Jul. 13, 1993, the disclosure of which is hereby incorporated by reference in its entirety. In the Le reference, the water soluble polymer is preferably a hydratable polymer selected from the group consisting of guars and derivatized guars, locusted bean gum, karaya gum, xanthan gum, polyvinyl alcohol and mixtures thereof. In another embodiment, synthetic viscosifying agents, such as polyvinyl alcohol, are also not employed. In an alternative embodiment, any of the viscosifying agents discussed herein can be employed, including the hydratable polysaccharides discussed above. In an embodiment, the viscosifying agent can be a synthetic viscosifying agent, such as a polyacrylamide polymer or a viscoelastic surfactant.

In an embodiment, the well servicing fluid does not include a cross-linker comprising a source of borate ions, such as boric acid or sodium borate decahydrate, in an effective amount for use as a cross-linking agent in the well servicing fluid. For example, the well servicing fluid could potentially be crosslinked with a zirconium crosslinker. The use of borate ions as a cross-linker for viscosifying gels is well known, as disclosed in the Le reference.

In an embodiment, the well servicing fluids are not employed as fracturing fluids. In another embodiment, the well servicing fluids of the present disclosure do not include proppants.

The present disclosure is also directed to a method of servicing a well using the well servicing fluids of the present disclosure. Any of the well servicing fluids disclosed herein can be used. In an embodiment, the method comprises combining a chelating agent, an acid and an aqueous based fluid comprising sulfate ions to form a well servicing fluid that is acidic.

The well servicing fluid ingredients can potentially be combined in any order. In an embodiment, the chelating agent is added to the aqueous based fluid prior to adding the acid. The amount of chelating agent employed can be based on the final acid strength and its potential dissolving power of calcium carbonate and magnesium carbonate. The potential dissolving power of the final acid strength will generate a certain concentration of calcium or magnesium during the stimulation process. By providing sufficient chelating agent to sequester the calcium and magnesium ions that are generated, formation of calcium sulfates or magnesium sulfates can be reduced.

Figure 11:
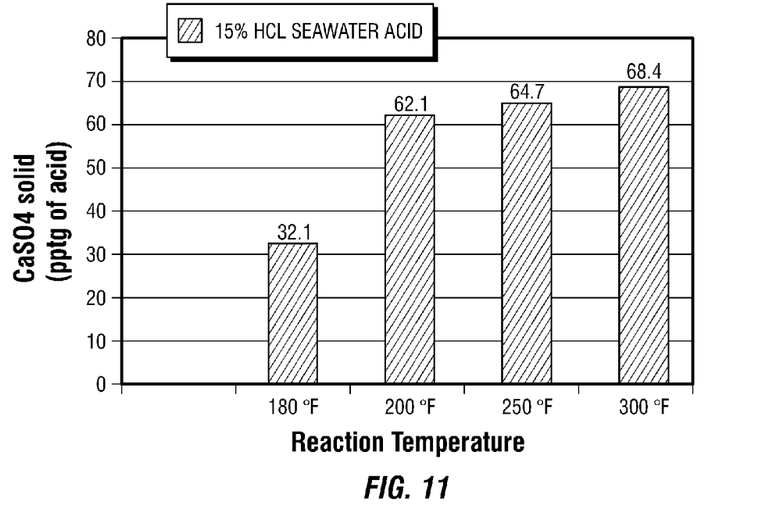
FIG. 11 is a graph showing exemplary amounts of calcium sulfate solid formed in seawater without chelating agent at various temperatures is shown in FIG. 11.

The well servicing fluid is introduced into a well so as to stimulate a formation comprising, for example, calcium carbonate (e.g., limestone), or calcium magnesium carbonate, (e.g., dolomite). As the acid dissolves portions of the well formation to thereby increase permeability, the concentration of multivalent cations, such as $Ca^{2+}$ and $Mg^{2+}$, increase in the well servicing fluid. A sufficient amount of the chelating agent is included so as to hinder a reaction of the multivalent cations with the sulfate ions to thereby reduce an amount of precipitate produced by the reaction in the well relative to the amount of precipitate that would otherwise have been formed using the same well servicing fluid without the chelating agent at the same well conditions. Exemplary amounts, in units of pounds per thousand gallons of well servicing fluid (pptg) of calcium sulfate solid formed in seawater without chelating agent at various temperatures is shown in FIG. 11.

The amount of precipitate produced can vary within acceptable parameters, which may be different for each well formation stimulated. For example, the amount of precipitate produced can be less than 5.0 pptg. In an embodiment, substantially no precipitate is formed.

The present disclosure will be further described with respect to the following examples, which are not meant to limit the invention, but rather to further illustrate the various embodiments.

EXAMPLES

The following examples relate to the HCl acid stimulation of limestone/dolomite formations surrounding oil and gas wells, and similar boreholes and to being able to use seawater-mixed acid systems without the precipitation of calcium sulfate solids.

Core studies with HCl mixed with fresh water, seawater, and seawater treated with 60 gpt of DEQUEST 2066 were conducted to show how the precipitation of calcium sulfate deposition or scaling can result in less effective acid stimulation results. The results of the core studies are summarized below.

Testing was conducted as regain water tests at 250° F. using quarried limestone (Indiana limestone). Using Isopar-L as the bit coolant and lubricant, 1" diameter core plugs were drilled from the stock limestone (Indiana limestone). After solvent extraction of residual hydrocarbons and salts, the samples were dried in a low temperatures oven (150° F.). Each sample was evacuated under tap water prior to use.

Example 1

Flow Testing

The following procedure was followed for flow testing:
1. The test sample was loaded into a preheated (180° F.) hassle-load coreholder and minimal confining stress was applied.
2. Tap water was injected against backpressure to avoid drying as the system temperature was elevated to test conditions (250° F.). Confining pressure was monitored to not exceed 1000 psi net pressure. Brine flow continued until differential pressure was stable. Specific permeability to brine was calculated.
3. Approximately 5 pore volumes of acid was injected at a low constant rate (1 cc/minute) against backpressure. Differential pressure was monitored.
4. Tap water was re-injected against backpressure. Where possible, differential pressure was monitored and post-treatment water permeability was determined.

TABLE 1

SUMMARY OF FLOW TEST RESULTS

| Test Description | Initial Permeability to Water, Millidarci (mD) | Final Permeability to Water Millidarci (mD) |
|---|---|---|
| 15% HCl in Tap Water | 2.13 | n/a* |
| 15% HCl in Seawater | 1.19 | 1.17 |
| 15% HCl in Seawater + 60 gpt DEQUEST 2066 | 1.20 | n/a* |

*This acid stimulation wormholed thru the core.

Figure 1:
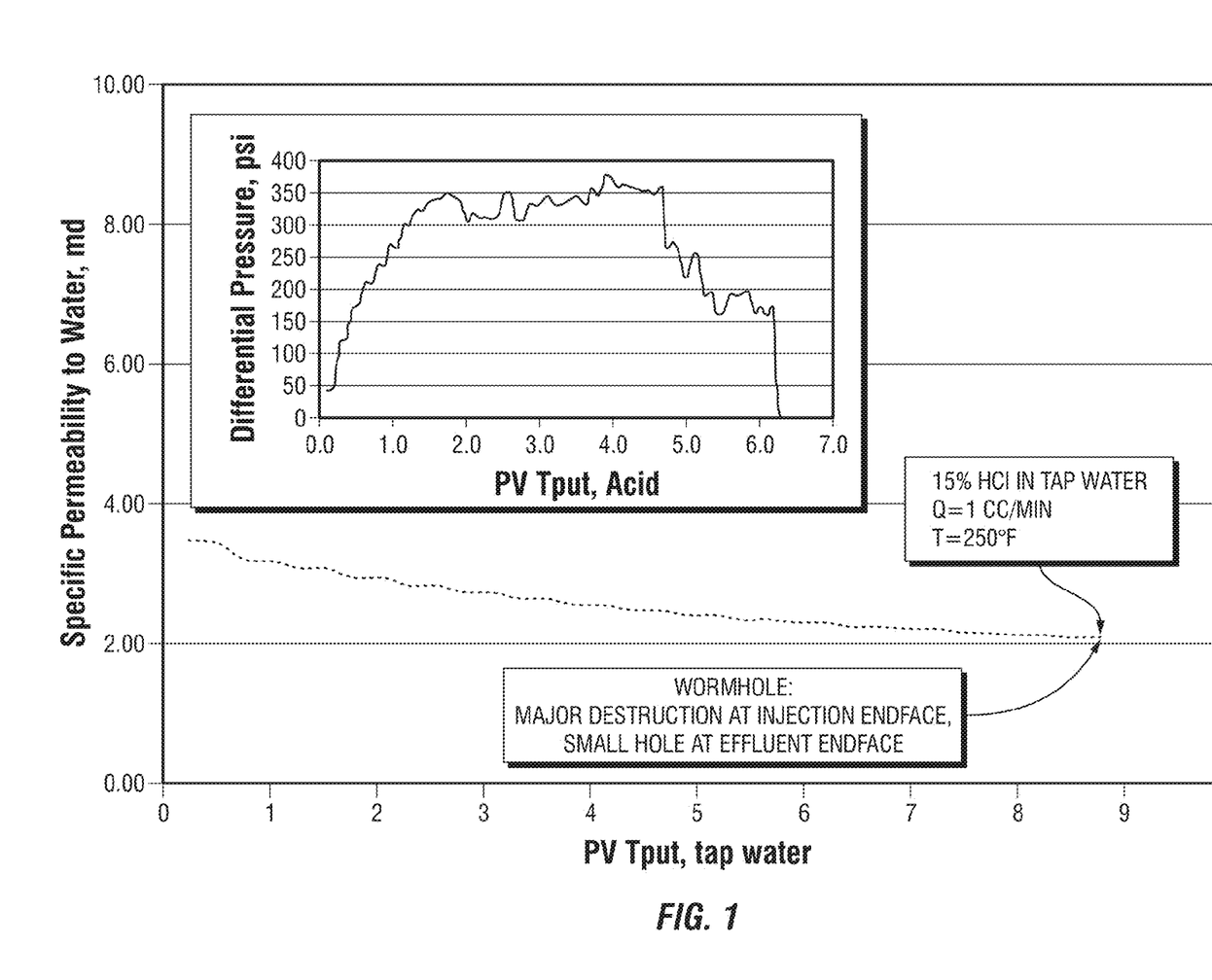
FIG. 1 is a graph representing data collected for flow testing a sample of 15% HCl in tap water, as described in the Examples below.
Figure 2:
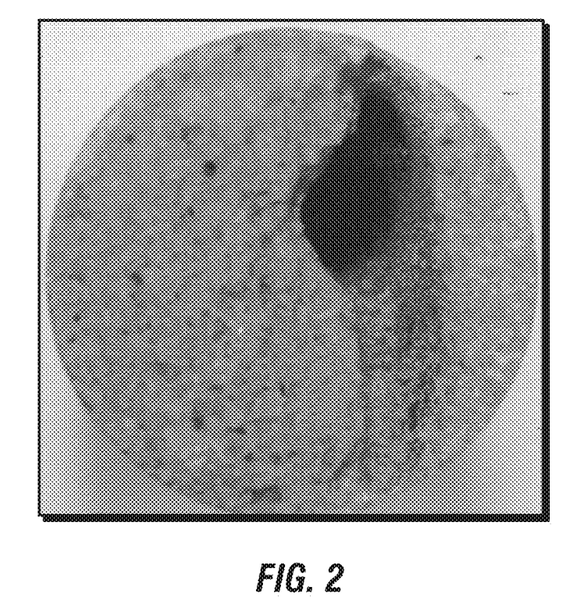
FIGS. 2 and 3 show the injection endface and outlet endface of a limestone core sample contacted with the 15% HCl in tap water sample of FIG. 1.
Figure 3:
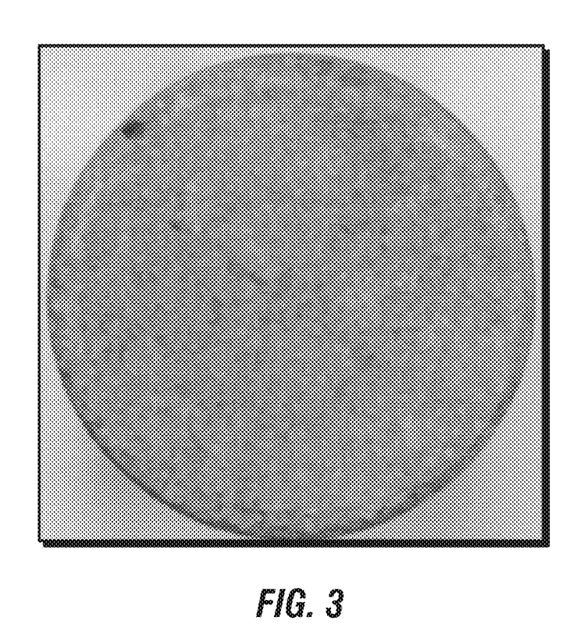
Figure 4:
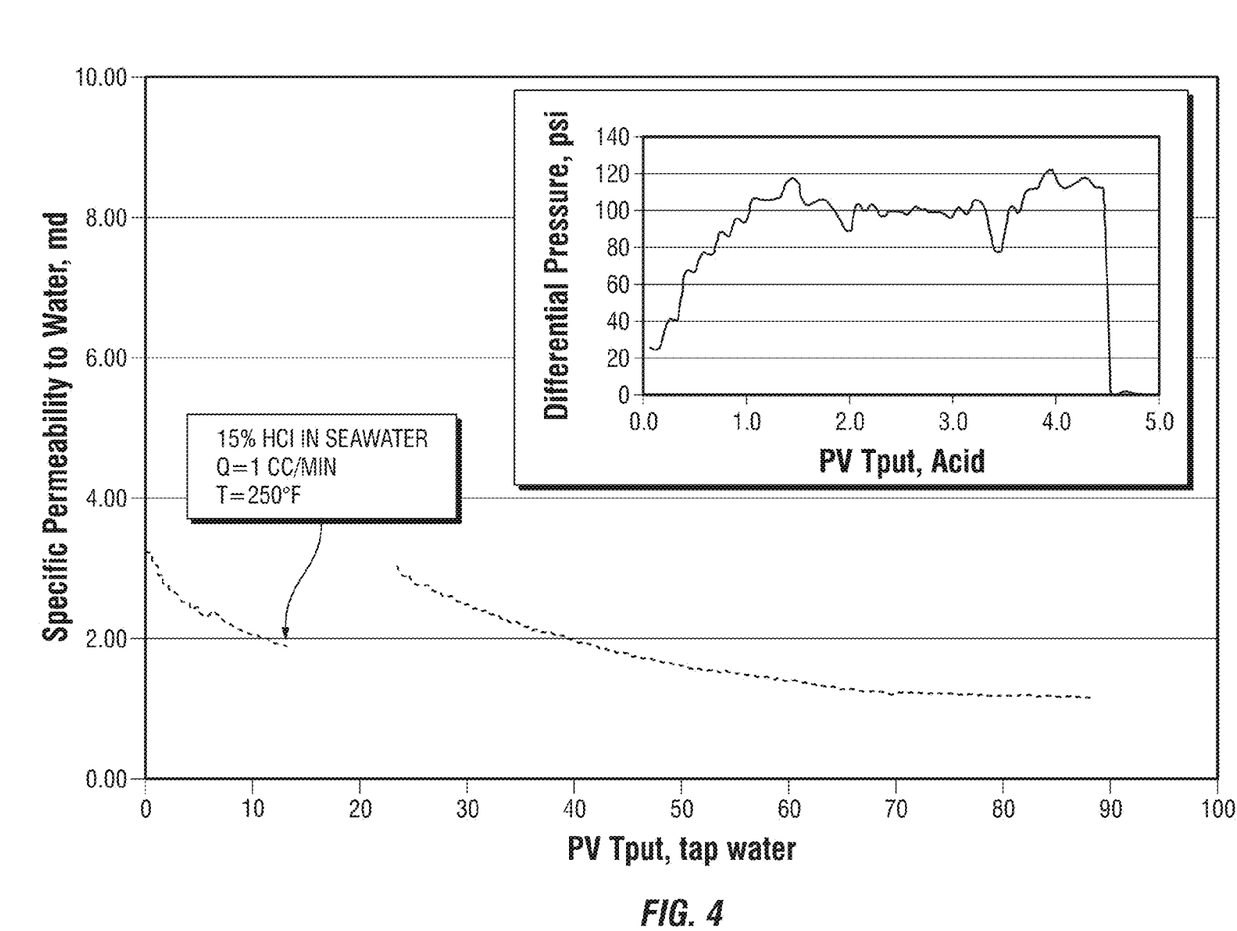
FIG. 4 is a graph representing data collected for flow testing a sample of 15% HCl in seawater, as described in the Examples below.
Figure 5:
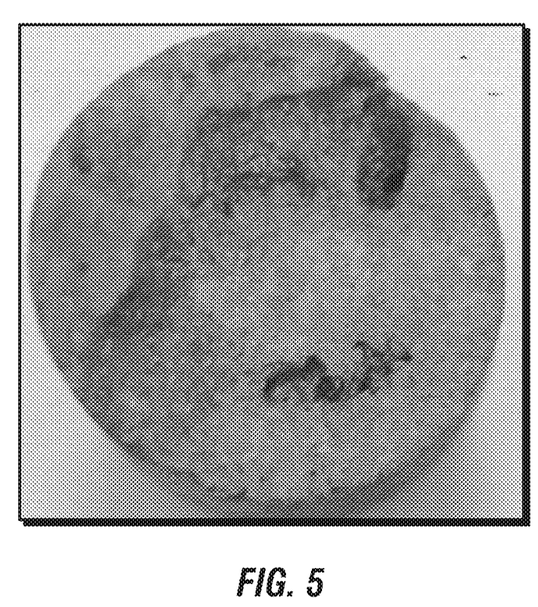
FIGS. 5 and 6 show the injection endface and outlet endface of a limestone core sample contacted with the 15% HCl in seawater sample of FIG. 4.
Figure 6:
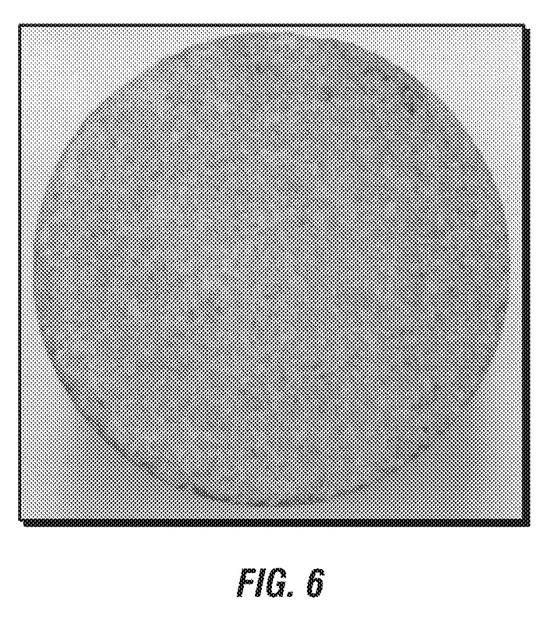
Figure 7:
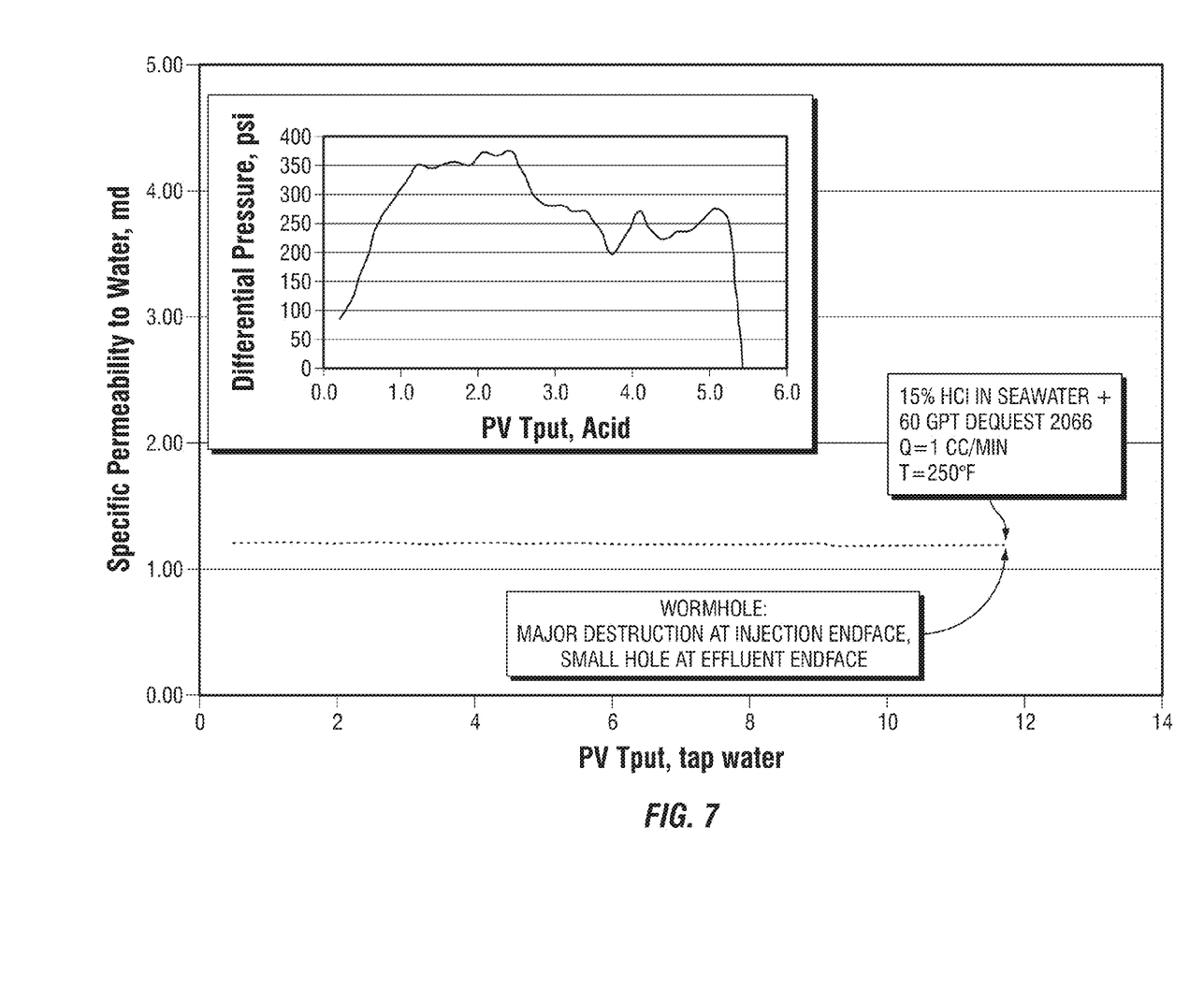
FIG. 7 is a graph representing data collected for flow testing a sample of 15% HCl in seawater prepared with 60 gpt of DEQUEST 2066, as described in the Examples below.
Figure 8:
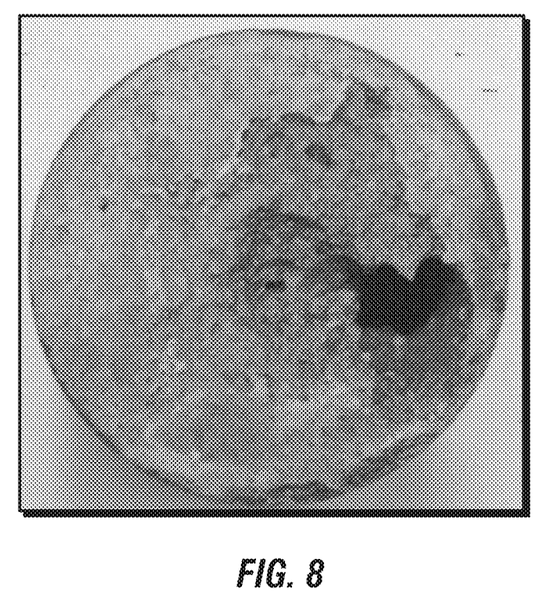
FIGS. 8 and 9 show the injection endface and outlet endface of a limestone core sample contacted with the 15% HCl in seawater prepared with DEQUEST 2066 sample of FIG. 7.
Figure 9:
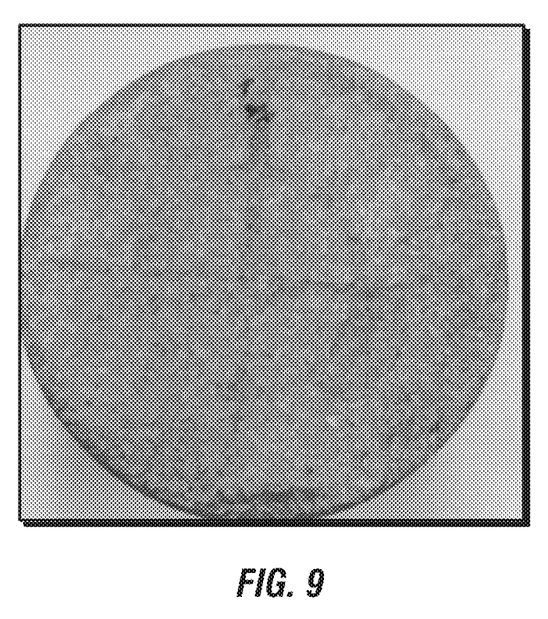

Data for each of the tests is shown in FIGS. 1 to 9. FIGS. 1, 4 and 7 represent the core flow stimulation studies conducted with 15% HCl acid mixed with fresh water, 15% HCl mixed with seawater, and 15% HCl mixed with seawater with 60 gpt Dequest 2066 cheating agents. The horizontal axis is Pore Volumes Through Put ("PV Tput"), tap water. The pore volume of a core is specific to that core sample and is based on a measurement of the bulk volume minus the grain volume. Pore volume is the capacity of the open area of the core in mls. Q is the flow rate in cc/min. The graphs show the relative permeability of the core during the flow of acid being pumped thru it. Testing indicated that 15% HCl in tap water alone or seawater containing 60 gpt DEQUEST 2066 was effective in creating large connected flowpaths (wormholes), as shown in FIGS. 2 and 8, after only several pore volumes of acid injection. Similar volumes of seawater based acid without DEQUEST 2066 did not form wormholes and was not considered effective in stimulation. The regain water permeability after seawater based acid was 98% of the original. Acid stimulation treatments can result in permeability increases of 150% or more.

Example 2

Testing for Reduction in Precipitate Formation

To prepare 1000 gallons of 15% HCl from seawater and 32% HCl stock in the field, a volume of 572 gpt of seawater and 433 gpt of 32% HCl acid would be required. A typical Middle East seawater (Qurayyah, Saudi Aramco region) that could be utilized to mix this HCl acid would have the following typical composition:

| Quarayyah Saudi Aramco Seawater | |
|---|---|
| Elemental Analysis | mg/l |
| Calcium | 644 |
| Magnesium | 2168 |
| Sodium | 17960 |
| Bicarbonate | 125 |
| Carbonate | 18 |

-continued

| Quarayyah Saudi Aramco Seawater | |
|---|---|
| Elemental Analysis | mg/l |
| Sulphate | 4450 |
| Chloride | 31773 |
| Total Dissolved solids | 57138 |
| Ca Hardness as CaCO3 | 1610 |
| Mg harness as MgCO3 | 8890 |
| Total hardness as CaCO3 | 10500 |
| pH | 8.1 |
| Specific Gravity @ 60 F. | 1.0424 |

In the laboratory, a 50 cc sample of 15% HCl acid would be mixed by the addition of 28.6 mls of seawater and 21.6 mls of 32% HCl acid. Tests conducted with this project at 180, 200, 250, and 300 Deg. F are detailed below. These tests were conducted with the following chelating agents.

1) DEQUEST 2066—Penta Na salt of Diethylenetriamine penta or Methylene Phosphoric Acid which is 24 to 26% by weight DTPMPA. pH=5.5
2) DEQUEST 2060S—Acid form of Diethylenetriamine penta or Methylene Phosphoric Acid which is 48 to 52% by weight DTPMPA. pH=0.11
3) DEQUEST 2090 Bis(hexamethylene triamine penta) methylenephosphonic acid Which is 43 to 48% by weight of BHMT. pH=0.39
4) DEQUEST 2060A—45 to 47% by weight of DTPMPA partially neutralized to pH 2 to 3.

Test Procedures A: Testing at Ambient Pressure:

The following test procedures were carried out to determine the effectiveness of each of the DEQUEST chelating agents 1-4 above for reducing precipitates. A sample with fresh water and a sample of seawater without an additive were also prepared and tested. Results of this testing are shown in Table 2.

1) Prepare a 15% HCl acid blank sample by the addition of 28.6 grams of fresh water with 25.1 grams of 32% HCl.
2) Prepare a 15% HCl acid (seawater) sample by the addition of 28.6 grams of the Quarrayyah seawater with 25.1 grams of 37% HCl.
3) Prepare a 15% HCl treated seawater acids mixed with seawater by the addition of 28.6 grams of seawater and the recommended concentration of the chemical additive and mix well. Then add the 25.1 grams of 32% HCl acid to finalize the acid blend.
4) In the 180 Deg. F atmospheric tests, place the mixed samples into the pre-heated water bath.
5) Add 10.4 grams of reagent calcium carbonate solid to the fluid slowly This amount of calcium carbonate is sufficient to neutralize 95% of the acid strength. Observe fluids for solid precipitation and record results.
6) Filter fluid thru a pre-weighed Whatman #1 filter paper and collect filtrate.
7) Dry filter paper in oven and weigh on analytical balance to obtain final weight.

TABLE 2

Tests At 180 Deg. F. With Atmospheric Pressure

| Test Solution | Weight of Solids Collected (g) | Fluid Characteristics | Weight of Scale After blank Correction (g) | % Reduction In Calcium Sulfate |
|---|---|---|---|---|
| 15% HCl (Fresh water) | 0 | Clear; no solids present | 0 | 0 |
| 15% HCl (Seawater) | 0.1923 (32.1 pptg) | Major CaSO4 solids | 0.1923 | |
| 15% HCl (Seawater + 60 gpt Dequest 2066) | 0 | Clear; no solids present | 0 | 100% |
| 15% HCl (Seawater + 30 gpt Dequest 2060s) | 0 | Clear; no solids present | 0 | 100% |
| 15% HCl (Seawater + 30 gpt Dequest 2090) | 0 | Clear; no solids present | 0 | 100% |
| 15% HCl (Seawater + 30 gpt Dequest 2066A) | 0 | Clear; no solids | 0 | 100% |

Test Procedures B: Testing at Above Ambient Pressures:

The following test procedures were carried out to determine the effectiveness of each of the DEQUEST chelating agents 1-4 above for reducing precipitates at high pressures and temperatures. A sample with fresh water and a sample of seawater without an additive were also prepared and tested. Results of this testing are shown in Tables 3-5.

1) In High Temperature/high pressure test, pre-heat heating jacket to desired temperature.
2) To the prepared 50 mls acid samples, add an open top PTFE plastic bottle with drill holes on bottom that has been pre-packed with 10.4 grains of analytical reagent grade calcium carbonate solid. This amount of calcium carbonate is sufficient to neutralize 95% of the acid strength.
3) Place the cap top with vent on the sample jar and place in the HTHP fluid loss cell.
4) Pressure HTHP cell with nitrogen to 1000 psi and place in pre-heated fluid loss cell jacket for a period of 3 hours.
5) Remove HTHP fluid loss cell from jacket and cool down to 180 degrees F. Release pressure from cell very slowly.
6) Remove jar from cell and observe fluid for any solid precipitate. Filter fluid thru a pre-weighed Whatman filter paper and dry in oven. After drying, measure weight of filler paper.

TABLE 3

Test at 200 Deg. F. With 1000 psi Nitrogen Pressure

| Test solution | Weight of Solids Collected (g) | Fluid Characteristics | Weight of Scale After blank Correction (g) | % Reduction In calcium Sulfate |
|---|---|---|---|---|
| 15% HCl (Fresh water) | 0.0334 | Clear; no solids present | 0 | 0 |
| 15% HCl (Seawater) | 0.3727 (62.19 pptg) | Major CaSO4 solids | 0.3727 | |

TABLE 3-continued

Test at 200 Deg. F. With 1000 psi Nitrogen Pressure

| Test solution | Weight of Solids Collected (g) | Fluid Characteristics | Weight of Scale After blank Correction (g) | % Reduction In calcium Sulfate |
|---|---|---|---|---|
| 15% HCl (Seawater + 60 gpt Dequest 2066) | 0.032 | Clear; no solids present | 0 | 100% |
| 15% HCl (Seawater + 30 gpt Dequest 2060s) | 0.0311 | Clear; no solids present | 0 | 100% |
| 15% HCl (Seawater + 30 gpt Dequest 2090) | 0.0416 | Clear; no solids present | .0082 | 97.8% |
| 15% HCl (Seawater + 30 gpt Dequest 2066A) | 0.0295 | Clear; no solids | 0 | 100% |

TABLE 4

Tests At 250 Deg. F. with 1000 psi Nitrogen Pressure

| Test Solution | Weight of Scale After blank Correction (g) | Fluid Characteristics | Weight of Solids Collected (g) | % Reduction In calcium Sulfate |
|---|---|---|---|---|
| 15% HCl (Fresh water) | 0.0354 | Clear; no solids present | 0 | 0 |
| 15% HCl (Seawater) | 0.3882 (64.7 pptg) | Major CaSO4 solids | 0.3882 | |
| 15% HCl (Seawater + 60 gpt Dequest 2066) | 0.0372 | Clear; no solids present | 0.0018 | 99.5% |
| 15% HCl (Seawater + 30 gpt Dequest 2060s) | 0.0453 | Clear; no solids present | 0.0099 | 97.4% |
| 15% HCl (Seawater + 30 gpt Dequest 2090) | 0.0423 | Clear; no solids present | .0169 | 95.6% |
| 15% HCl (Seawater + 30 gpt Dequest 2066A) | 0.0325 | Clear; no solids | 0 | 100% |

TABLE 5

Tests At 300 Deg. F. With 1000 psi Nitrogen Pressure

| Test Solution | Weight of Solids Collected (mg) | Fluid Characteristics | Weight of Scale After blank collection (mg) | % Reduction In Calcium Sulfate |
|---|---|---|---|---|
| 15% HCl (Fresh water) | 0.0269 | Clear; no solids present | 0 | 0 |
| 15% HCl (Seawater) | 0.4103 (68.4 pptg) | Major CaSO4 solids | 0.4103 | |
| 15% HCl (Seawater + 60 gpt Dequest 2066) | 0.0393 | Clear; no solids present | 0.0124 | 96.6% |
| 15% HCl (Seawater + 30 gpt Dequest 2060s) | 0.0318 | Clear; no solids present | 0.0049 | 98.8% |
| 15% HCl (Seawater + 30 gpt Dequest 2090) | 0.0523 | Clear; no solids present | 0.0254 | 93.8% |
| 15% HCl (Seawater + 30 gpt Dequest 2066A) | 0.0381 | Clear; no solids | 0.0112 | 90.7% |

Figure 10:
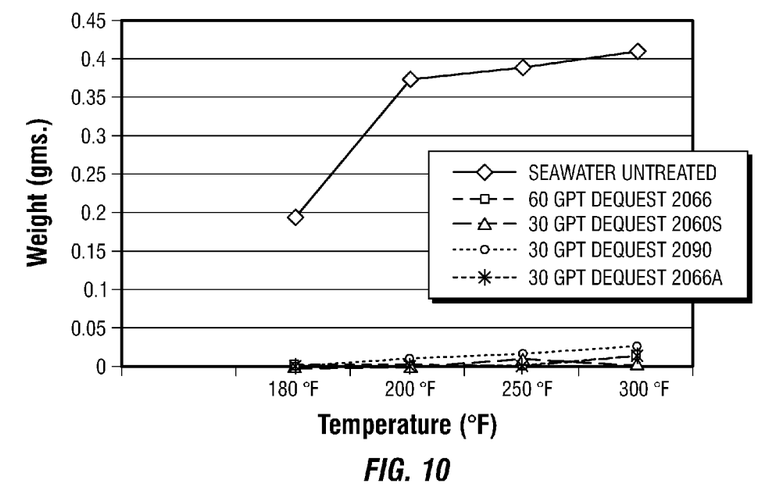
FIG. 10 is a graph showing data collected from precipitate testing, as described in the Examples below.

The data collected from precipitate testing is summarized in FIG. 10. The data shows that when the chelating agents and seawater are employed, the amount of calcium sulfate precipitate formed at both ambient and above ambient pressures is significantly reduced in comparison to samples using the seawater without the chelating agents.

It was also discovered that certain chelating agents did not provide acceptable results for chelating magnesium and calcium under the acidic and relatively high temperature conditions tested. Examples of agents that did not provide sufficient chelating ability include 1-hydroxyethane 1,1-diphosphonic acid (HEDP), polyacrylic acid, cesium formate, titanium oxide; a cheating agent composed of aminotrimethylene phosphonic acid, diethylenetriamine pentamethylene phosphonic acid and ammonium hydroxide; MAGNACIDE 575, zirconium propionate, ascorbic acid, succinic acid, polymethyl meta acrylate, alkanolamine phosphate; GLDA, which is an (I-glutamic acid, N,N-di (acetic acid), tetrasodium salt) chelate, from the DISSOLVINE® product line of chelates available from AkzoNobel Functional Chemicals of Amersfoort, The Netherlands; diethylene triamine pentaacetic acid (DTPA), HEDTA, which is a Hydroxyethylethylenediamine triacetate from the DISSOLVINE® product line of chelates available from AkzoNobel Functional Chemicals of Amersfoort, The Netherlands; polyaspartic acid, erythorbic acid, nitrilotriacetic acid and boric acid. It is believed that the limited ability of these compounds to chelate calcium and magnesium ions may have been due to limited solubility and/or limited rates of reaction causing them to be quickly overwhelmed, although other factors may have been responsible. They were not as effective in chelating sufficient amounts of divalent ions and consequently resulted in undesirable amounts of precipitate formation.

Although various embodiments have been shown and described, the present disclosure is not so limited and will be understood to include all such modifications and variations as would be apparent to one skilled in the art.

What is claimed is:
1. A well servicing fluid formulated by combining ingredients comprising:
an aqueous based fluid comprising sulfate ions at a concentration greater than 50 mg/l;
a chelating agent; and an acid in an amount sufficient to result in the well servicing fluid having a pH of 1 or less, the well servicing fluid not employing xanthan gum in an amount effective for use as a viscosifying agent.

2. The fluid of claim 1, wherein the aqueous based fluid comprises seawater.

3. The fluid of claim 1, wherein the concentration of sulfate ions is greater than 200 mg/l.

4. The fluid of claim 1, wherein the aqueous based fluid has a total hardness, as $CaCO_3$, of greater than 1000 mg/l.

5. The fluid of claim 1, wherein the acid comprises HCl.

6. The fluid of claim 1, wherein the chelating agent comprises at least one compound chosen from inorganic polyphosphates or polyphosphonic acids or salts or esters thereof.

7. The fluid of claim 1, wherein the chelating agent comprises at least one compound chosen from calcium phosphates, magnesium polyphosphates or sodium polyphosphates.

8. The fluid of claim 1, wherein the chelating agent comprises at least one compound chosen from nitrilotrimethylene phosphonic acid or salts or esters thereof, ethylenediamine hydroxydiphosphonic acid or salts or esters thereof, or ethylenediamine tetramethylene phosphonic acid or salts or esters thereof.

9. The fluid of claim 1, wherein the chelating agent comprises at least one compound chosen from diethylenetriaminepenta (methylene phosphonic acid) or salts or esters thereof.

10. The fluid of claim 1, wherein the chelating agent comprises at least one compound chosen from bis(hexamethylene triamine penta) methylene phosphonic acid or salts or esters thereof.

11. The fluid of claim 1, wherein a source of borate ions is not employed in an amount effective for use as a cross-linking agent in the well servicing fluid.

12. The fluid of claim 1, wherein a galactomannan gum is not employed in an amount effective for use as a viscosifying agent in the well servicing fluid.

13. The fluid of claim 1, wherein the well servicing fluid does not include proppant.

14. The fluid of claim 1, wherein the well servicing fluid is formulated with at least one additional compound chosen from non-emulsifiers, viscosifying agents, surfactants, clay stabilization additives, biopolymer degradation additives, fluid loss control additives or high temperature stabilizers.

15. A method of servicing a well, the method comprising:
combining a chelating agent, an acid and an aqueous based fluid comprising sulfate ions in solution at a concentration greater than 50 mg/l to form an acidic well servicing fluid exhibiting a pH of 1 or less, the well servicing fluid not employing xanthan gum in an amount effective for use as a viscosifying agent; and
introducing the acidic well servicing fluid into a well in a well formation and dissolving a portion of the well formation containing calcium carbonate with the acid so as to stimulate the well formation, thereby increasing a concentration of multivalent calcium cations in solution in the well servicing fluid,
using the chelating agent, hindering a reaction of the increased concentration of multivalent calcium cations in solution with the sulfate ions in solution and reducing an amount of precipitate produced by the reaction in the well relative to the amount of precipitate that would otherwise have been produced if the chelating agent was not present.

16. The method of claim 15, wherein the concentration of sulfate ions is greater than 200 mg/l.

17. The method of claim 15, wherein the amount of precipitate produced is less than 5.0 pptg and the aqueous based fluid comprises seawater.

18. The method of claim 15, wherein the acid comprises HCl.

19. The method of claim 15, wherein the chelating agent comprises at least one compound chosen from inorganic polyphosphates or polyphosphonic acids or salts or esters thereof.

20. The method of claim 15, wherein the chelating agent comprises at least one compound chosen from nitrilotrimethylene phosphonic acid or salts or esters thereof, ethylenediamine hydroxydiphosphonic acid or salts or esters thereof, or ethylenediamine tetramethylene phosphonic acid or salts or esters thereof.

21. The method of claim 15, wherein the chelating agent comprises at least one compound chosen from diethylenetriaminepenta (methylene phosphonic acid) or salts or esters thereof.

22. The method of claim 15, wherein the chelating agent comprises at least one compound chosen from bis(hexamethylene triamine penta) methylene phosphonic acid or salts or esters thereof.

23. The method of claim 15, wherein a source of borate ions is not employed as a cross-linking agent in the well servicing fluid.

24. The method of claim 15, wherein the well formation further comprises calcium magnesium carbonate and the method further comprises:
increasing a concentration of multivalent magnesium cations in solution in the well servicing fluid; and
using the chelating agent, hindering a reaction of the increased concentration of multivalent magnesium cations in solution with the sulfate ions in solution and reducing an amount of precipitate produced by the reaction in the well relative to the amount of precipitate that would otherwise have been produced if the chelating agent was not present.

25. A method of servicing a well, the method comprising:
combining a chelating agent, an acid and an aqueous based fluid comprising sulfate ions in solution at a concentration greater than 50 mg/l to form an acidic well servicing fluid exhibiting a pH of 1 or less, the chelating agent including at least one compound chosen from diethylenetriaminepenta (methylene phosphonic acid) or salts or esters thereof, nitrilotrimethylene phosphonic acid or salts or esters thereof, ethylenediamine hydroxydiphosphonic acid or salts or esters thereof, ethylenediamine tetramethylene phosphonic acid or salts or esters thereof, or bis(hexamethylene triamine penta) methylene phosphonic acid or salts or esters thereof; and
introducing the acidic well servicing fluid into a well in a well formation and dissolving a portion of the well formation containing calcium carbonate with the acid so as to stimulate the well formation, thereby increasing a concentration of multivalent calcium cations in solution in the well servicing fluid,
using the chelating agent, hindering a reaction of the increased concentration of multivalent calcium cations in solution with the sulfate ions in solution and reducing an amount of precipitate produced by the reaction in the well relative to the amount of precipitate that would otherwise have been produced if the chelating agent was not present.

* * * * *